United States Patent [19]

Yamakawa et al.

[11] Patent Number: 5,527,860
[45] Date of Patent: Jun. 18, 1996

[54] PROCESS FOR PRODUCING A DIOLEFIN POLYMER OR COPOLYMER AND A RUBBER COMPOSITION CONTAINING SUCH A DIOLEFIN POLYMER OR COPOLYMER

[75] Inventors: Yoshitaka Yamakawa; Kyouyuu Yasuda; Iwakazu Hattori; Hideaki Yokoyama; Tatsuro Hamada, all of Tokyo, Japan

[73] Assignees: Japan Synthetic Rubber Co., Ltd.; Bridgestone Corporation, both of Tokyo, Japan

[21] Appl. No.: 184,217

[22] Filed: Jan. 21, 1994

[30] Foreign Application Priority Data

Jan. 29, 1993 [JP] Japan .................................. 5-013632

[51] Int. Cl.⁶ .......................... C08F 8/42; C08F 4/08
[52] U.S. Cl. ................ 525/332.9; 525/272; 525/313; 525/331.9; 525/333.2; 525/342; 525/352; 525/370; 525/375; 525/377; 525/379; 525/382; 525/383; 525/386; 526/175; 526/180; 526/181; 526/220
[58] Field of Search ........................ 526/173, 175, 526/180, 181, 340, 220; 525/272, 313, 331.9, 333.2, 342, 352, 370, 375, 377, 379, 382, 383, 386

[56] References Cited

U.S. PATENT DOCUMENTS

| | | |
|---|---|---|
| 4,129,705 | 12/1978 | de Zarauz ............................... 526/175 |
| 4,401,800 | 8/1983 | Hall ......................................... 526/175 |
| 4,647,634 | 3/1987 | Jalics .................................. 526/175 X |
| 4,914,147 | 3/1990 | Mouri et al. . | |
| 4,933,401 | 6/1990 | Hattori et al. ........................... 526/175 |
| 5,300,599 | 4/1994 | Hsu et al. ............................ 526/175 X |
| 5,393,721 | 2/1995 | Kitamura et al. ................... 526/174 X |

FOREIGN PATENT DOCUMENTS

| | | |
|---|---|---|
| 0096875 | 12/1983 | European Pat. Off. . |
| 0331400 | 9/1989 | European Pat. Off. . |
| 2250774 | 6/1975 | France . |
| 2856751 | 7/1979 | Germany ............................... 526/175 |
| 54-100484 | 8/1979 | Japan . |
| 59-38209 | 3/1984 | Japan . |
| 61-81455 | 4/1986 | Japan . |
| 62-109801 | 5/1987 | Japan . |
| 63-297410 | 12/1988 | Japan . |
| 64-70541 | 3/1989 | Japan . |
| 51298 | 1/1993 | Japan . |

*Primary Examiner*—Fred Teskin
*Attorney, Agent, or Firm*—Sughrue, Mion, Zinn, Macpeak & Seas

[57] ABSTRACT

A process for producing a diolefin polymer or copolymer, comprising the steps of polymerizing 55–100 wt % of a conjugated diolefin with 0–45 wt % of an aromatic vinyl compound as monomers in a hydrocarbon as a solvent, by using initiators: a reaction product [a1] between at least one secondary amine compound (A) and an organic lithium compound and/or a lithium amide compound [a2] of the at least one secondary amine compound (A) as well as a reaction product [b1] between at least one alcohol (B) and an organic lithium compound and/or a lithium alkoxide compound of the at least one alcohol (B). A rubber composition containing not less than 30 wt % of such a diolefin polymer or copolymer with respect to an entire rubber component is also disclosed. This rubber composition exhibits excellent abrasion resistance, high tensile strength, steering stability and low rolling resistance, and is suitable for tires, particularly, as treads of low fuel consumption tires.

19 Claims, No Drawings

PROCESS FOR PRODUCING A DIOLEFIN POLYMER OR COPOLYMER AND A RUBBER COMPOSITION CONTAINING SUCH A DIOLEFIN POLYMER OR COPOLYMER

BACKGROUND OF THE INVENTION

1. Field of the Invention

The present invention relates to a process for producing a polymer or copolymer to be appropriately used for tire treads having excellent abrasion resistance, high tensile strength, steering stability and low rolling resistance. More particularly, the invention relates to a process for producing a conjugated diolefin polymer or copolymer by polymerizing a conjugated diolefin or copolymerizing a conjugated diolefin and an aromatic vinyl compound by using a specific initiator in a relatively short time and effectively modifying polymerization- or copolymerization-active terminals with a tin compound, a silicon compound and/or an organic compound containing a hetero atom, said specific initiator being a reaction product between a secondary amine compound and an organic lithium compound and/or a lithium amide compound, a reaction product between a specific alcohol and an organic lithium compound and/or a specific lithium alkoxide compound. The invention also relates to a rubber composition containing such a polymer or copolymer and suitable for use in tire treads.

2. Related Art Statement

With increased demand for low fuel consumption in automobiles, conjugated diolefin polymers or copolymers having all of excellent abrasion resistance, low rolling resistance, steering stability and high tensile strength have been recently requested as rubber materials, particularly, for tire treads.

In order to reduce rolling resistance of the tire, an energy loss of a vulcanized rubber has to be decreased. As indices for evaluating the vulcanized rubber, rebound resilience at 50° C.–80° C., tan δ at 50° C.–80° C. Goodrich heat generation, etc have been employed. Raw rubber materials having larger rebound resilience at 50°–80° C., smaller tan δ at 50° C.–80° C. or smaller Goodrich heat generation are preferable.

Up to now, styrene-butadiene copolymers having various structures polymerized with organic lithium initiators and styrene-butadiene copolymers having terminals of copolymers modified with functional groups have been proposed as raw rubber materials having large rebound resilience. For example, there are styrene-butadiene copolymers having their terminals modified or coupled with tin compounds as well as styrene-butadiene copolymers having their terminals modified with a nitrogen-containing compound such as an isocyanate compound, an oxazolidinone compound, or a dialkylaminobenzophenone compound.

However, the polymer or copolymer obtained by using the organic lithium initiator has a smaller amount of functional groups introduced therein through modification of the terminals of the polymer or copolymer. Accordingly, it was difficult to realize the demand for improving the above physical properties such as abrasion resistance and reduced rolling resistance.

Formerly, two processes were known to increase the amount of functional groups introduced. That is, the amount of functional groups introduced is increased (1) by effecting the polymerization with use of a lithium amide initiator and modifying or coupling the terminals of the resulting polymer or copolymer (Japanese patent application Laid-open No. 59-38,209 and Japanese patent publication No. 5-1,298), or (2) by preliminarily reacting an organic lithium initiator with a vinyl compound having functional groups in a small scale, and effecting the polymerization with use of the resulting reaction product, while the terminals of the polymer or copolymer are modified (Japanese patent publication No. 5-1298). However, it is reported in these publications that a longer time is required to obtain the polymer or copolymer as compared with a case where polymerization is effected with the organic lithium initiator alone. Further, reactivity of the terminals of the polymer or copolymer drops, so that the efficiency of a modifying reaction is unfavorably low. Thus, it has been difficult to increase the introduced amount of functional groups.

On the other hand, in a case that a diolefin or an olefin which is substituted with a polar group such as an ester, a nitrile or an aryl group is polymerized (copolymerized) with an alkaline metal amide compound, it is known that a yield of the polymer or copolymer is increased through the addition of alkaline metal alkoxide (Japanese patent application Laid-open No. 54-100,484).

However, since this process also needs a long time to obtain the polymer or copolymer in the case of the polymerization of the conjugated diolefin and/or aromatic vinyl compound, the above-mentioned problem of the prior art could not be solved by this process, either.

That is, in actuality, the speed of the polymerization of the conjugated diolefin and/or the aromatic vinyl compound with use of the lithium amide initiator is small, and the reactivity of active terminals of the polymer or copolymer is small.

Tires are broadly classified into (1) low fuel consumption tires making much of low rolling resistance, (2) large size tires to be used in trucks or buses making much of abrasion resistance, and (3) high performance tires making much of steering stability and high tensile strength at high speeds, depending upon uses thereof.

As to low fuel consumption tires, the tires are improved to some extent by the above technical idea. As to the high performance tires, trials have been made to increase an amount of an extender oil or to add a special liquid rubber or the like. However, these trials both deteriorate the rolling resistance and abrasion resistance, so that it is difficult to simultaneously satisfy all of the performances mentioned above.

For large tires, although high cis-polybutadiene has been conventionally mainly used, it is unfavorably difficult to modify or couple the terminals of the polymer.

That is, it is an actual situation that a conjugated diolefin polymer or copolymer applicable to all of the above uses has not been discovered.

SUMMARY OF THE INVENTION

It is therefore an object of the present invention to provide a process for producing a polymer or copolymer by the step of polymerizing a conjugated diolefin alone or copolymerizing such a conjugated diolefin and an aromatic vinyl compound, which can shorten a polymerization or copolymerization time. The producing process of the invention may further comprise the step of modifying or coupling the resulting polymer or copolymer, which improve modifying or coupling reactivity.

It is another object of the present invention to provide a rubber composition having excellent abrasion resistance, high tensile strength, low rolling resistance, and steering stability improved and composed of the polymer or copolymer produced by the invention process.

The present invention relates to a process for producing the diolefin polymer or copolymer, comprising the step of polymerizing 55–100% by weight of a conjugated diolefin with 0–45% by weight of an aromatic vinyl compound as monomers by using initiators [a1]and/or [a2] as well as initiators [b1] and/or [b2] in a hydrocarbon as a solvent, in the presence of an ether compound or a tertiary amine if necessary.

[a1] a reaction product between at least one secondary amine compound (A) selected from the group consisting of compounds represented by the following formulae (a1-1), (a1-2) and (a1-3) and an organic lithium compound, a molar ratio between said at least one secondary amine compound (A) and said organic lithium compound being 1:0.2–5:

(a1-1)

in which $R^1$ and $R^2$ are the same or different, and denote a group selected from an alkyl group having the number of carbon atoms of 1–20 or an aryl group having the number of carbon atoms of 6–20:

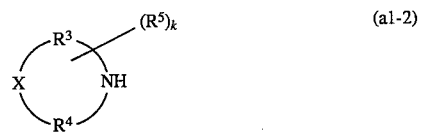
(a1-2)

in which $R^3$ and $R^4$ are the same or different and denote an alkylene group having the number of carbon atoms of 1–3, X is a group selected from —$CH_2$—, —O— or —NH—, $R^5$ is an alkyl group having the number of carbon atoms of 1–5, and k is an integer of 0–4:

(a1-3) 5-benzyloxyindole, 3-azaspiro[5,5]undecane, 3-azabicyclo[3,2,2]nonane, and carbazole:

[a2] lithium amide compound obtained by substituting Li for H in a >NH group of said secondary amine compound (A):

[b1] a reaction product between at least one alcohol (B) selected from the group consisting of compounds represented by the following formulae (b1-1), (b1-2), (b1-3), (b1-4) and (b1-5) and an organic lithium compound, a molar ratio between said at least one alcohol (B) and said organic lithium compound being 1:0.8–5:

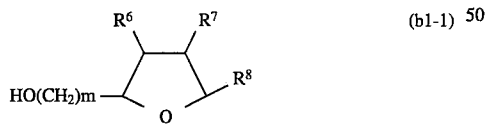
(b1-1)

in which $R^6$, $R^7$, and $R^8$ are the same or different, and denote H— or an alkyl group having the number of carbon atoms of 1–5, and m is an integer of 1–3:

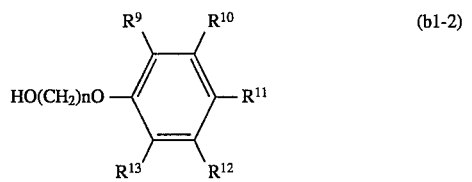
(b1-2)

in which $R^9$, $R^{10}$, $R^{11}$, $R^{12}$, and $R^{13}$ are the same or different, and denote H— or one selected from the group consisting of alkyl groups having the number of carbon atoms of 1–5, and n is an integer of 1–3:

(b1-3) $R^{14}{}_pN[(CH_2)_q—OH]_{3-p}$ in which $R^{14}$ is an alkyl group having the number of carbon atoms of 1–20 or an aryl group having the number of carbon atoms of 6–20, p is an integer of 0–2, and q is an integer of 1–3:

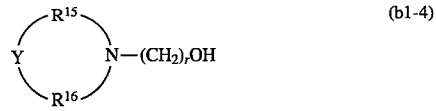
(b1-4)

$R^{15}$ and $R^{16}$ are the same or different, and denote an alkylene group having the number of carbon atoms of 1–3, Y is a group selected from the group consisting of —$CH_2$—, —O—, —NH— and =N—$(CH_2)_sOH$, r is an integer of 1–3, and s is an integer of 1–3:

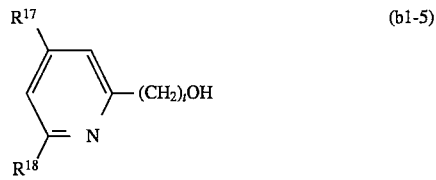
(b1-5)

$R^{17}$ and $R^{18}$ are the same or different, and denote H— or an alkylene group having the number of carbon atoms of 1–5, and t is an integer of 1–3:

[b2] a lithium alkoxide compound obtained by substituting Li for H of the —OH in the alcohol (B).

The following are preferred as specific embodiments of the producing process of the present invention.

(1) The producing process further comprises the step of, after the polymerization, modifying or coupling polymerization- or copolymerization-active terminals with use of one or more compounds, as a modifier, selected from the group consisting of the following compounds $a_o$ to $k_o$, within a time period during which said polymerization- or copolymerization-active terminals remain.

"$a_o$" an isocyanate compound and/or an isothiocyanate compound

"$b_o$" a derivative of an isocyanuric acid and/or a thiocarbonyl-containing compound having a chemical structure corresponding to that of said isocyanuric acid derivative "$c_o$" a urea compound "$d_o$" an amide compound and/or an imide compound "$e_o$" an N-alkyl-substituted oxazolidinone compound "$f_o$" a pyridyl-substituted ketone compound and/or a pyridyl-substituted vinyl compound "$g_o$" a lactam compound "$h_o$" a silicon compound "$i_o$" an ester compound "$j_o$" a ketone compound "$k_o$" a tin compound The following (2) through (15) are preferred embodiments of the above preferred one (1) of the producing process of the present invention.

(2) The producing process set forth above, wherein before said modifier is added, 0.5–500 mol of 1,3-butadiene per 1 gram equivalent of lithium atoms is added, and then the polymerization or copolymerization is further effected.

(3) The producing process set forth above, wherein the molar ratio between said lithium compound of said [a1] or said lithium amide compound of said [a2] and said organic lithium compound of said [b1] or said lithium alkoxide compound of [b2] is 1:0.01–2.0.

(4) The producing process set forth above, wherein said [a1] is a reaction product between the secondary amine compound of the formula (a1-1) and said organic lithium compound, and said [a2] is the lithium amide compound obtained by substituting Li for H in —NH groups of the compound of said (a1-1).

(5) The producing process set forth above, wherein said [b1] is a reaction product between the compound of said (b1-1) and/or the compound of said (b1-3) and said organic lithium compound, and [b2] is the lithium alkoxide compound obtained by substituting Li for H in —OH groups of the compound of said (b1-1) and/or the compound of said (b1-3).

(6) The producing process set force above, wherein said organic lithium compound is an alkyl lithium having the number of carbon atoms of 3–10.

(7) The producing process set forth above, wherein said hydrocarbon solvent is a cycloaliphatic hydrocarbon and/or an alphatic hydrocarbon having the number of carbon atoms of 3–10.

(8) The producing process set forth above, wherein said conjugated diolefin is 1,3-butadiene and/or isoprene, and said aromatic vinyl compound is styrene.

(9) The producing process set forth above, wherein said [a1] is a reaction product between di-n-butylamine and said organic lithium compound, and [a2] is lithium di-n-butyl amide.

(10) The producing process set forth above, wherein said [b1] is a reaction product between N,N-diethyl ethanolamine and/or tetrahydrofurfuryl alcohol and said organic lithium compound, and [b2] is N,N-diethylamino lithuim ethoxide and/or tetrahydrofurfuryl lithium alkoxide.

(11) The producing process set forth above, wherein said modifier is at least one compound selected from the group consisting of the isocyanate compound $(a_o)$, the silicon compound $(h_o)$ and the tin compound $(k_o)$.

(12) The producing process set forth above, wherein as said modifier is used at least one kind of the tin compounds $(k_o)$ in an amount of 0.05–5 gram equivalents per one gram equivalent of lithium atoms.

(13) The producing process set forth above, wherein a rate of the modified or coupled polymer or copolymer to the entire polymer or copolymer is not less than 20% by weight.

(14) The producing process set forth above, wherein a content of vinyl groups in said diolefin polymer or copolymer is 15–40% by weight based on said polymer or diolefin portion of said copolymer.

(15) The producing process set forth above, wherein the polymerization is effected by using, as an initiator, said [a1] being a reaction product between di-n-butyl amine and an organic lithium compound and/or [a2] being lithium d-n-butylamide and said [b1] being a reaction product between N,N-diethyl ethanolamine and/or tetrahydrofurfuryl alcohol and the organic lithium compound and/or [b2] being N,N-diethylaminolithium ethoxide and/or tetrahydrofurfuryl lithium alkoxide; further polymerization is effected after 0.5–500 mol of 1,3-butadiene is added to the resulting polymer or copolymer per 1 gram equivalent of lithium; and the resulting polymer or copolymer is modified or coupled by adding at least modifier selected from the group consisting of polymeric type diphenylmethane diisocyanate, dimethyl adipate, 4,4'-bis(dimethylamino)benzophenone, tin tetrachloride, silicon tetrachloride, and tin dichlorodibutyl, thereby making the rate of the modified or coupled polymer or copolymer not less than 20% by weight relative to the entire polymer or copolymer.

(16) The present invention also relates to a rubber composition containing not less than 30% by weight of the conjugated diolefin polymer or copolymer produced by any one of the above processes with respect to an entire rubber component.

The following rubber composition is preferred as a specific embodiment of the rubber composition of the present invention, which is produced by the process comprising the steps of:

(i) copolymerizing 55–90% by weight of said conjugated diolefin and 45–10% by weight of said aromatic vinyl compound as the monomers; and (ii) after the polymerization, modifying or coupling active terminals of the resulting copolymer with use of one or more compounds, as a modifier, selected from the group consisting of said compounds $(a_o)$, $(h_o)$ and $(k_o)$ within a time period during which said active terminals remain.

These and other objects, features and advantages of the invention will be appreciated upon reading of the following description of the invention, with the understanding that some modifications, variations and changes of the invention could be made by the skilled person in the art to which the invention pertains without departing from the spirit of the invention or the scope of claims appended hereto.

DETAILED DESCRIPTION OF THE INVENTION

The process of the invention for the production of the conjugated diolefin polymer or the conjugated diolefin-aromatic vinyl compound copolymer is characterized in that the conjugated diolefin alone or the conjugated diolefin and the aromatic vinyl compound are solution-polymerized or solution-copolymerized in a solvent of a hydrocarbon with use of a specific initiator, in the presence of an ether or a tertiary amine compound if necessary, said specific initiator being a reaction product between a secondary amine compound and an organic lithium compound and/or a lithium amide compound as well as a reaction product between a specific alcohol and an organic lithium compound and/or a specific lithium alkoxide compound. Terminals of the resulting polymer or copolymer may be modified or coupled.

As the conjugated diolefin compound, for example, 1,3-butadiene and isoprene may be recited, and 1,3-butadiene is preferred among them. As the aromatic vinyl compound, for example, styrene, vinyltoluene, p-methylstyrene, and α-methylstyrene may be recited, and styrene is preferred among them.

The content of bound aromatic vinyl compound is 0–50% by weight, preferably 10–45% by weight. If the content of the bound aromatic vinyl compound exceeds 50% by weight, rebound resilience lowers. On the other hand, the content of the vinyl bonds in the conjugated diolefin portion of the above polymer or copolymer is preferably 15–90%. If the content is less than 15%, it may be difficult to produce the polymer or copolymer aimed at by the present invention in some cases. The vinyl content of 15–40% effectively improves tensile strength, and abrasion resistance and rolling resistance. Particularly, the rolling resistance is conspicuously improved when the content of the vinyl bonds is 30–70%. Further, when the content of the vinyl bonds is 50–90%, the gripping performance and steering stability are effectively improved.

As a hydrocarbon solvent, for example, pentane, hexane, heptane, octane, methylcyclopentane, cyclohexane, benzene, and xylene may be recited.

As the initiator, a reaction product between a secondary amine compound and an organic lithium compound and/or a lithium amide compound and a reaction product between a specific alcohol and an organic lithium compound and/or a specific lithium alkoxide are used.

As the secondary amine compounds corresponding to (a1-1) of the initiators used in the present invention, for example, dimethylamine, diethylamine, dipropylamine, di-n-butylamine, dipentylamine, dihexylamine, dioctylamine, dicyclohexylamine, and N-methylbenzylamine may be recited.

As the secondary amine compounds corresponding to (a1-2), for example, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, 2,5-dimethylpyrrolidine, 2,5-dimethyl- 3-pyrrolidine, azetidine, and heptamethylene imine may be recited.

As the compounds corresponding to (a1-3), 5-benzyloxyindole, 3-azaspiro[5,5]undecane, 3-azabicyclo[3,2,2] nonane, and carbazole may be recited.

As specific examples of the lithium amide compounds, for example, lithium dimethylamide, lithium diethylamide, lithium dipropylamide, lithium di-n-butylamide, lithium dipentylamide, lithium dihexylamide, lithium dioctylamide, lithium N-methylbenzylamide, lithium dicyclohexylamide, lithium morpholinoamide, and lithium piperazinoamide may be recited.

Each of these lithium amide compounds may be used alone, but each of them may be used together with at least one kind of potassium compounds or organic potassium compounds disclosed in Japanese patent application Laid-open No. 63-297,410 in an amount of 0.001–0.5 mols per 1 gram equivalent of lithium.

As specific examples of the alcohols corresponding to the above (b1-1), for example, tetrahydrofurfuryl alcohol, furfuryl alcohol, 3-methyl-tetrahydrofurfuryl alcohol, 4-ethyl-tetrahydrofurfuryl alcohol, and oligomers of tetrahydrofurfuryl alcohol may be recited. Among them, tetrahydrofurfuryl alcohol is preferred.

As specific examples of the compounds corresponding to (b1-2), for example, ethylene glycol monophenylether, and ethylene glycol monobutylether may be recited.

As the compounds corresponding to (b1-3), for example, N,N-dimethylethanolamine, N,N-diethylethanolamine, N,N-dibutylethanolamine, N,N-diphenylethanolamine, N-methyldiethanolamine, N-ethyldiethanolamine, N-butyldiethanolamine, N-phenyldiethanolamine, N,N-dimethylpropanolamine, N,N-dibutylpropanolamine, N-methyldipropanolamine, N-ethyldipropanolamine, 1-(2-hydroxyethyl)pyrrolidine, 2-methyl-1-(2-hydroxyethyl)pyrrolidine, 2-methyl-1-(3-hydroxypropyl)pyrrolidine, 1-piperidine ethanol, 2-phenyl-1-piperidine ethanol, 2-ethyl- 1-piperidine propanol, N-β-hydroxyethylmorpholine, 2-ethyl-N-β-hydroxyethylmorpholine, 1-piperadine ethanol, 1-piperadine propanol, N,N'-bis(β-hydroxyethyl)piperadine, and N,N'-bis(β-hydroxypropyl)piperadine may be recited.

Among them, N,N-dimethylethanolamine, N,N-dimethylethanolamine, and 1-piperizine ethanol are preferred.

As the compounds corresponding to (b1-4), for example, 2-(β-hydroxyethyl)pyridine, and 2-(γ-hydroxypropyl)-pyridine may be recited.

As specific examples of the organic lithium compounds used in the present invention, ethyllithium, propyllithium, n-butyllithium, sec-butyllithium, and t-butyllithium, and hexyllithium may be recited. Among them, n-butyllithium and sec-butyllithium are preferred.

Further, each of these organic lithium compounds may be used alone, but each of them may be used together with at least one kind of potassium compounds and organic potassium compound disclosed in Japanese patent application Laid-open No. 63-297,410 in an amount of 0.001–0.5 mol per one gram equivalent of lithium.

It is necessary that the molar ratio between the secondary amine compound (A) in the above [a1] component and the organic lithium compound is 1:0.2–5. If the molar ratio between the organic lithium compound and the secondary amine compound (A) exceeds 5, tensile strength, abrasion resistance and rolling resistance cannot be improved. On the other hand, if the molar ratio of the organic lithium compound is less than 0.2, the polymerizing speed greatly decreases. The molar ratio between the secondary amine compound (A) and the organic lithium compound is preferably 1:1.

Further, it is necessary that the molar ratio between the alcohol (B) in the above [b1] component and the organic lithium compound is 1:0.8–5. If the molar ratio of the organic lithium compound exceeds 5, tensile strength, abrasion resistance and rolling resistance cannot be improved. On the other hand, if the molar ratio of the organic lithium compound to the alcohol (B) is less than 0.8, the polymerizing speed greatly decreases. The molar ratio between the alcohol (B) and the organic lithium compound is preferably 1:1.

Furthermore, it is preferable that the molar ratio between the reaction product of the [a1] component and the organic lithium compound or the lithium amide compound [b2] and the reaction product of [b1] component and the organic lithium compound or the lithium alkoxide compound [b2] is 1: 0.01–2.0. Further, when the initiator is prepared from the [a] component {[a1] and/or [a2]} and the [b] component {[b1] and/or [b2]}, it is preferable that 1–100 mols, more preferably 1–50 mols of 1,3-butadiene is added relative to 1 mol of the [a] component. By so doing, the polymerizating reaction smoothly proceeds.

In the present invention, as the specific compound to be used for modifying or coupling active terminals of the resulting polymer or copolymer produced in the present invention within a time period during which said active terminals remain, at least one compound selected from the group consisting of the following ($a_o$) through ($k_o$) may be used.

($a_o$) an isocyanate compound and/or an isothiocyanate compound (hereinafter referred to briefly as ($a_o$) component)

($b_o$) a derivative of an isocyanuric acid and/or a thiocarbonyl-containing compound having a chemical structure corresponding to that of said isocyanuric acid derivative (hereinafter referred to briefly as ($b_o$) component)

($c_o$) an urea compound (hereinafter referred to briefly as ($c_o$) component)

($d_o$) an amide compound and/or an imide compound (hereinafter referred to briefly as ($d_o$) component)

($e_o$) an N-alkyl-substituted oxazolidinone compound (hereinafter referred to briefly as ($e_o$) component)

($f_o$) a pyridyl-substituted ketone compound and/or a pyridyl-substituted vinyl compound (hereinafter referred to briefly as ($f_o$) component)

($g_o$) a lactam compound (hereinafter referred to briefly as ($g_o$) component)

($h_o$) a silicon compound (hereinafter referred to briefly as ($h_o$) component)

($i_o$) an ester compound (hereinafter referred to briefly as ($i_o$) component)

($j_o$) a ketone compound (hereinafter referred to briefly as ($j_o$) component)

($k_o$) a tin compound (hereinafter referred to briefly as ($k_o$) component)

Among these compounds, specific examples of the isocyanate compounds or the isothiocyanate compounds as the ($a_o$) component include 2,4-trilenedisocyanate, 2,6-trilenediisocyanate, diphenylmethanediisocyanate, organic type diphenylmethane diisocyanate (C-MDI), phenylisocyanate, isohorondiisocyanate, hexamethylenediisocyanate, butylisocyanate, 1,3,5-benzentriisocyanate, phenylisothiocyanate, and phenyl-1,4-diisothiocyanate may be recited.

Specific examples of the derivative of an isocyanuric acid and the thiocarbonyl-containing compound having the chemical structure corresponding to that of said isocyanuric acid derivative which are recited as the ($b_o$) component include derivatives of carbamic acid, such as methyl carbamate and methyl N,N-diethylcarbamate, isocyanuric acid, derivatives of isocyanuric acid, such as N,N', N'-trimethyl-isocyanuric acid As specific examples of the urea compounds as the ($c_o$) component, N,N'-dimethyl urea, N,N'-diethyl urea, N,N,N', N'-tetramethyl urea, and N,N-dimethyl-N',N'-diphenyl urea may be recited.

As specific examples of the amide compounds and imide compounds as the ($d_o$) component, for example, amides such as N,N-dimethylformamide, acetoamide, N,N-diethylacetoamide, aminoacetoamide, N,N-dimethyl-N,N'-dimethylaminoacetoamide, N,N-dimethylaminoacetoamide, N,N-ethylaminoacetoamide, N,N-dimethyl-N'-ethylaminoacetoamide, acrylamide, N,N-dimethylacrylamide, N,N-dimethylmetacrylamide, nicotinamide, isonicotinamide, picorinic amide, N,N-dimethylisonicotinamide, succinic amide, phthalamide, N,N,N', N'-tetramethylphthalamide, oxamide, N,N,N',N'-tetramethyloxamide, 2-furancarbonic amide, xynoline-2-carbonic amide, and N-ethyl-N-methyl-xynoline carbonic amide, and imides such as succinic imide, N-methylsuccinic imide, maleimide, N-methylmaleimide, phthalimide, and N-methylphthalimide may be recited.

As specific examples of the N-alkyl substituted oxazolidinone compounds as the ($e_o$) component, for example, 1,3-diethyl-2-imidazolidinone, 1,3-dimethyl-2-imidazolidinone, 1,1-dipropyl-2-imidazolidinone, 1-methyl- 3-ethyl-2-imidazolidinone, 1-methyl-3-propyl-2-imidazolidinone, 1-methyl-3-butyl-2-imidazolidinone, 1-methyl- 3-(2-methoxyethyl)-2-imidazolidinone, 1-methyl-3-( 2-ethoxyethyl)-2-imidazolidinone, and 1,3-di-(2-ethoxyethyl)- 2-imidazolidinone may be recited.

As specific examples of the pyridyl-substituted ketone compounds as the ($f_o$) component, for example, methyl-2-pyridyl ketone, methyl-4-pyridylketone, propyl- 2-pyridylketone, di-4-pyridylketone, propyl-3-pyridylketone, 2-benzoylpyridine, 2-vinylpyridine, and 4-vinylpyridine may be recited.

As specific examples of the lactum compounds as the ($g_o$) component, for example, N-methyl-2-pyrrolidone, 2-piperidone, N-methyl-2-piperidone, 2-quinoline, and N-methylquinolone may be recited.

The use amount of one or more of these compounds as the ($g_o$) component is ordinarily 0.2–10 equivalents, preferably 0.5–5.0 equivalents based on the functional group, i.e., on isocyanate group, the isothiocyanate group, the carbonyl group, the vinyl group, or the aldehyde group per one atomic equivalent of alkaline metal atoms. If the use amount is less than 0.2 equivalents, rebound resilience and low heat generation property of the vulcanized rubber become poorer, whereas if the use amount is more than 10 equivalents, an amount of a non-reacted material increases to generate offensive odor, raise the vulcanizing speed or deteriorate the rebound resilience and the low heat generation property of the vulcanizate.

As specific examples of the silicon compounds as the ($h_o$) component, for example, dibutyldichlorosilane, methyltrichlorosilane, methyldichlorosilane, tetrachlorosilane, and triphenoxymethylsilane may be recited. The addition amount of one or more of these compounds may be in an amount of 0.05–5 equivalents, preferably 0.1–1.5 equivalents based on the halogen atoms or the phenoxy group with respect to one atomic equivalent of alkaline metal atoms.

As specific examples of the ester compounds as the (i) component, for example, diethyl adipate, diethyl malonate, diethyl phthalate, diethyl glutarate and diethyl maleate may be recited. The addition amount of one or more of these compounds may be 0.05–5 equivalents per one atomic equivalent of alkaline metal atoms.

As specific examples of the ketone compounds as the ($j_o$) component, for example, N-methyl-2-pyrrolidone, N,N-dimethylformamide, nicotinamide, and 4,4'-bis(diethylamino)benzophenone may be recited. The addition amount of one or more of these compounds may be 0.05–5 equivalent per one atomic equivalents of alkaline metal atoms.

As specific examples of the tin compounds as the ($k_o$) component, for example, tin tetrachloride, tin tetraboromide, butyl tin trichloride, methyl tin trichloride, octyl tin trichloride, dimethyl tin dibromide, dimethyl tin dichloride, dioctyl tin dichloride, 1,2-bis(trichlorostanyl)ethane, 1,2-bis(methyldichlorostanyl)ethane, 1,4-bis(trichlorostanyl)butane, 1,4-bis(methyldichlorostanyl)butane, ethyl tin tristearate, butyl tin trisoctanoate, butyl tin trisstearate, butyl tin trislaurate, dibutyl tin bisoctanoate, dibutyl tin bisstearate, and dibutyl tin bislaurate may be recited.

The addition amount may be in a range of 0.05–5 equivalents per one atomic equivalent of lithium atoms.

Each of the compounds to be reacted with the polymer or copolymer produced may be used singly or in combination with one or more kinds of the other. In order to enhance both reactivity of polymerization site and reactivity of these compounds towards the active terminilas of polymer or copolymer, it is preferable that after 1,3-butadiene is further added to the polymerization system in amount of 0.5–500 mols, preferably 1–200 mols per one gram atomic equivalent of lithium atoms, the modifying or coupling reaction is effected for the active terminals.

Among the above-recited compounds, the use of the tin compounds gives excellent improvement upon abrasion resistance and rolling resistance aimed at by the present invention, which affords the polymer or copolymer to be favorably used for low fuel consumption tires or large size tires. In addition, the above compounds among the ($a_o$) through ($j_o$) components are preferred for high performance tires requiring steering stability and high tensile strength, and an extender oil and/or a liquid rubber may be added to the polymers or copolymers modified or coupled with these compounds.

It is preferable that the polymer or copolymer according to the present invention contains not less than 20% by weight of the polymer or copolymer having terminal modified or coupled. If the content of the polymer or copolymer having the terminals modified or coupled is less than 20% by weight, tensile strength and rebound resilience become unfavorably poorer. The polymerization or copolymerization reaction and the modifying reaction or coupling reaction are effected in a range of 0°–120° C. These reactions may be effected under a temperature-elevated or heated condition. The polymerization or copolymerization system may be a batch polymerization or copolymerization or a continuous polymerization or copolymerization.

As to the microstructure of conjugated diolefin polymer or the conjugated diolefin portion of the copolymer, the content of vinyl bonds may be varied by adding an ether such as tetrahydrofuran, diethylether, dimethoxybenzene, dimethoxyethane, ethylene glycol dibutylether, or tertiary amine compounds such as triethylamine, pyridine, N,N,N', N'-tetramethylethylenediamine, and/or dipiperidinoethane to the polymerization or copolymerization system.

Further, it is preferable that the Mooney viscosity ($ML_{1+4}$, 100° C.) of the polymer or copolymer of the present invention is in a range of 20–200. If the Mooney viscosity is less than 20, tensile strength and rebound resilience become unfavorably poorer. On the other hand, if the Mooney viscosity is more than 100, processability becomes unfavorably poorer. In the latter case, however, the Mooney viscosity may be lowered to not more than 100 by adding an extender oil such as an aromatic process oil or a naphthenic process oil, which enables the polymer or copolymer to be used without trouble in processing. In this connection, note is to be taken that if an extender oil is added to the polymer or copolymer modified or coupled with the tin compound, tin-carbon bonds are unfavorably readily cut under an acidic condition.

The rubber composition according to the present invention is composed of the above-mentioned polymer or copolymer as an indispensable component, and may include other rubber component in the form of a blend. Preferably, one or more kinds of rubbers selected from the group consisting of natural rubber, high-cis poly-butadiene polymerized by using nickel, cobalt, titanium or neodymium as a catalyst, emulsion-polymerized styrene-butadiene copolymer, solution-polymerized styrene-butadiene copolymer which has no tertiary amine groups at terminals of the copolymer with the content of bound styrene of 10–40% by weight and the content of vinyl bonds of 15–80% by weight in the conjugated diolefine portion, low-cis polybutadiene, and ethylene-propylene-diene terpolymer are blended as other rubber component or components. The rubber composition is obtained by further compounding a process oil such as an aromatic process oil or naphthenic process oil, other various compounding agents and a vulcanizer to the resulting mixture depending upon necessity. It is necessary that the polymer or copolymer obtained by the present invention is contained in the rubber composition in an amount of 30% by weight or more relative to 100 parts by weight of the rubber composition. If the percentage of the polymer or copolymer is less than 30% by weight, the rubber composition having excellent abrasion resistance, rolling resistance, steering stability and high tensile strength as aimed at by the present invention cannot be obtained.

EXPERIMENTS

The present invention will be explained with reference to specific examples given below, but it should be understood that the present invention is not limited to those examples and variations, modifications or changes of the invention are, to be made, so long as they do not fall outside the gist of the present invention.

Various measurements made in the following experiments were effected by the following methods.

(1) Mooney viscosity:

Mooney viscosity was measured at a temperature of 100° C. after preheating for 1 minute and driving a rotor for 4 minutes according to Japanese Industrial Standard (abbreviated "JIS") K6300.

(2) Microstructure of polymer or copolymer:

The microstructure of the polymer or copolymer was determined by an infrared absorption spectrum method (Morero's method).

(3) Content of bound styrene:

The content of bound styrene was determined based on a calibration curve formed by utilizing the infrared absorption spectrum method.

(4) Weigth-average molecular weight, Number-average molecular weight and molecular weight distribution:

The weigth-average molecular weight, the number-average molecular weight and the molecular weight distribution were determined on the basis of polystyrene by a gel permeation chromatography (GPC) with Chromatography machine Type 244 manufactured by Water Co. Ltd.

(5) Coupling efficiency:

The coupling efficiency was determined from a change in molecular weight between before and after the modifier was added. The coupling efficiency denotes the rate of the polymer or copolymer having the terminals modified or coupled, relative to the entire polymer or copolymer.

(6) Physical properties of vulcanizate:

Physical properties of the vulcanizate were evaluated in various measurements with respect to the vulcanizate obtained by kneading a raw rubber and other additives in a 250 cc laboratory plastmill according to a compounding recipe in Table 1, and vulcanizing the mixture at 145° C. for a given time period.

(7) Tensile strength:

Tensile strength was measured according to JIS K6301.

(8) Lambourn abrasion index:

Abraded amount was measured by using a Lambourn abrasion tester at a slip rate of 25%. Results are shown by index. The temperature was at room temperature room temperature. The greater the index, the more excellent is the abrasion resistance.

(9) Tan $\delta$ at 50° C. and tan $\delta$ at 0° C.:

Tan $\delta$ at 50° C. was measured by using a dynamic spectrometer manufactured by Reometrics Co., Ltd. in U.S.A. under the conditions that a tensile dynamic strain was 1%, a frequency was 10 Hz, and temperature was 50° C. Results are shown by index. The greater the figure, the better or smaller is the rolling resistance. Further, tan $\delta$ at 0° C. was measured by using the same machine under the conditions that tensile dynamic strain was 0.1%, a frequency was 10 Hz, and temperature was 0° C. Results are shown by index. The greater the figure, the better or greater is the wed skid resistance.

(10) Dry skid performance:

Dry skid performance was measured by using a portable skid tester manufactured by Road Research Co., Ltd. in England. An asphalt road was used for testing. Results are shown by index. The greater the figure, the greater is the gripping performance and the better is the steering stability.

Preparation of polymer (copolymer)

EXAMPLE 1

Into a 300 ml pressure-proof bottle were added 25 g of cyclohexane, 1.69 mmols of lithium diethylaminoethoxide as a [b2] component, 3.4 mmols of di-n-butylamine as a [a1] component, and 3.4 mmols of n-butyllithium in this order, which were reacted at 27° C. for 15 minutes. Then, 37 mmols of 1,3-butadiene was added to the reaction mixture, which were reacted for another 15 minutes to obtain a solution of an initiator.

Next, as shown in Table 2, 2400 g of cyclo-hexane, 240 g of styrene, 324 g of 1,3-butadiene, and 1.68 g of tetrahydrofuran were charged into a reactor vessel having an inner volume of 5 liters purged by nitrogen. After the mixture was set to a polymerization-initiating temperature of 60° C., the entire initiator solution prepared above was added to the monomer solution to effect the copolymerization. When the conversion rate reached 100%, 36 g of 1,3-butadiene was added to convert terminals of the copolymer to lithium butadienyl. Then, 1.26 mmol silicon tetrachloride was added to the reaction mixture, which were reacted for 10 minutes. Thereafter, 2,6-di-tertiary butyl-p-cresol was added to the copolymer solution, to which 37.5 parts by weight of a highly aromatic extender oil (AROMA manufactured by Japan Synthetic Rubber) was added relative to 100 parts by weight of the copolymer. The solvent was removed from the copolymer solution by steam stripping, and the copolymer was dried by using hot rolls at 110° C.

Meanwhile, a part of the copolymerized solution was extracted when the polymerized rate was 5%, and it was confirmed through analysis of the copolymer with NMR that tertiary amino groups were quantitatively introduced into initiating terminals of the copolymer.

EXAMPLE 2

Same sample as in Example 1 except that the extender oil in Example 1 was replaced by liquid rubber.

EXAMPLE 3

Same sample as in Example 1 except that 0.1 mmol of potassium dodecylbenzene sulfonate was used in combination with 3.4 mmol of n-butyllithium.

EXAMPLE 4

Same sample as in Example 1 except that the addition amount of lithium diethylamino ethoxide was changed to 3 mmol, that is, the molar ratio of the initiators [a] and [b] was changed from 1:0.5 to 1:0.88.

EXAMPLE 5

Same sample as in Example 1 except that the modifier in Example 1 was changed to diethyl adipate.

EXAMPLE 6

Same sample as in Example 1 except that the modifier in Example 1 was changed to 4,4'-bis(diethylamino)benzophenone.

EXAMPLE 7

Same sample as in Example 1 except that the modifier in Example 1 was changed to C-MD1.

EXAMPLES 8 AND 9 AND COMPARATIVE EXAMPLE 4

Same samples as in Example 7 except that the contents of vinyl bonds and bound styrene in Example 7 were varied. In Comparative Example 4, the content of styrene was 60% by weight, which falls outside the claims of this application.

EXAMPLE 10

Same sample as in Example 7 except that the amount of initiator was increased, and neither extender oil nor liquid rubber were added.

EXAMPLE 11

Same sample as in Example 10 except that the content of bound styrene was 0%.

EXAMPLE 12

Same sample as in Example 10 except that the contetns of vinyl bonds and bound styrene were varied.

EXAMPLE 13

Same sample as in Example 10 except that the addition amount of n-BuLi was increased to 9 mmol, that is, the molar ratio of the (a1) and butyl lithium was changed from 1:1 to 1:1.2.

EXAMPLE 14

Same sample as in Example 10 except that no additional butadiene was added before the addition of C-MD1.

EXAMPLE 15

Same sample as copolymerized in Example 10 except that diethylaminoethanol (3.7 mmol), dibutylamine (7.4 mmol) and n-BuLi (11.1 mmol) were directly added in this order to the reactor vessel in which the solvent, butadiene and styrene had been charged. A part of a polymerization solution was extracted when the conversion rate was 7%. It was confirmed through analysis of the copolymer with NMR that the tertiary amino groups were quantitatively introduced into initiating terminals of the copolymer.

EXAMPLE 16

Same sample as copolymerized in Example 10 except that dibutylamine (7.4 mmol), diethylaminoethanol (3.7 mmol) and n-BuLi (11.1 mmol) were directly added in this order to the reactor vessel in which the solvent, butadiene and styrene had been charged. A part of a polymerization solution was extracted when the conversion rate was 8%. It was confirmed through analysis of the copolymer with NMR that the tertiary amino groups were quantitatively introduced into initiating terminals of the copolymer.

EXAMPLE 17

Same sample as copolymerized in Example 10 except that the initial copolymerization temperature was changed to 40° C.

EXAMPLE 18

Into a 300 ml pressure-proof bottle were added 25 g cyclohexane, 3.7 mmol of lithium diethylaminoethoxide as [b2] component, 7.4 mmol of di-n-butylamine as [a1] component, and 7.4 mmol of n-butyllithium in this order, which were reacted at 27° C. for 15 minutes. Then, 37 mmol of 1,3-butadiene was added to the reaction mixture, which were reacted for another 15 minutes to obtain a solution of an initiator.

Next, as shown in Table 3, 2400 g of cyclohexane, 240 g of styrene, 324 g of 1,3-butadiene, and 1.68 g of tetrahydrofuran were charged into a reactor vessel having an inner volume of 5 liters purged by nitrogen. After the mixture was set to the initial polymerization temperature of 60° C., the entire initiator solution prepared above was added to the monomer solution to effect the copolymerization. When the conversion rate reached 100%, 36 g of 1,3-butadiene was added to convert terminals of the copolymer to butadienyl-lithium. Then, 3.4 mmol of dibutyl tin dichloride was added to the reaction mixture, which were reacted for another 10 minutes. Thereafter, 2,6-di-tertiary butyl-p-cresol was added to the copolymer solution, and the solvent was removed from the solution by steam stripping. Finally, the copolymer was dried by using hot rolls at 110° C.

EXAMPLE 19

Same sample as in Example 18 except that the amount of the initiator was increased, and the modifier was replaced by tin tetrachloride.

EXAMPLE 20

Same sample as copolymerized in Example 18 except that dibutylamine (7.4 mmol) and n-BuLi (7.4 mmol) were used as the [a1] component, and diethylaminoethanol (3.7 mmol) and n-BuLi (3.7 mmol) were used as the [b1] component.

EXAMPLE 21

Same sample as copolymerized in Example 20 except that the charged amounts of styrene, butadiene and tetrahydrofurane were varied.

EXAMPLE 22

Same sample as copolymerized in Example 20 except that the amount of tetrahydrofuran was varied.

EXAMPLE 23

Same sample as copolymerized in Example 18 except that lithium di-n-butylamide (7.4 mmol) was used as the [a2] component, and lithium diethylaminoethoxide (2.2 mmol) were used as the [b2] component.

EXAMPLE 24

Same sample as copolymerized in Example 18 except that lithium diethylamide (7.4 mmol) was used as the [a2] component, and tetrahydrofurfuryl alcohol (3.7 mmol) and n-BuLi (3.7 mmol) were used as the [b1] component.

EXAMPLE 25

Same sample as copolymerized in Example 18 except that N-methylbenzylamine (7.4 mmol) and n-BuLi (7.4 mmol) were used as the [a2] component, and lithium diethylaminoethoxide (3.7 mmol) was used as the [b2] component.

EXAMPLE 26

Same sample as copolymerized in Example 18 except that the charged amount of tetrahydrofuran was increased.

COMPARATIVE EXAMPLE 1

Same sample as in Example 1 except that the initiator was replaced by n-BuLi (3 mmol).

COMPARATIVE EXAMPLE 2

Same sample as in Example 11 except that the initiator was replaced by n-BuLi (7 mmol), the modifier was changed to silicon tetrachloride, and neither extender oil nor liquid rubber were used.

COMPARATIVE EXAMPLE 3

Same sample as in Example 12 except that the initiator was replaced by n-BuLi (6.3 mmol), the modifier was changed to silicon tetrachloride, and neither extender oil nor liquid rubber were used.

COMPARATIVE EXAMPLE 5

Same sample as copolymerized in Example 18 except that dibutylamine (9.1 mmol) and n-BuLi (9.1 mmol) as the [a1] component and no [b] component were used as the initiator. As compared with Example 18, the rate of copolymerization and the coupling efficiency were both reduced.

COMPARATIVE EXAMPLE 6

Same sample as copolymerized in Example 18 except that n-butyllithium was used alone as the initiator.

COMPARATIVE EXAMPLE 7

Copolymerization was carried out under the same conditions as in Example 18 except that N-methylaniline (7.4 mmol) was used as the secondary amine compound in the (a1) component, but no polymer or copolymer was produced.

COMPARATIVE EXAMPLE 8

Same sample as copolymerized in Example 18 except that the dibutylamine (7.4 mmol) and n-BuLi (7.4 mmol) were used as the [a1] component, and lithium tertiary butoxide (3.7 mmol) was used as the [b2] component.

COMPARATIVE EXAMPLE 9

A copolymer having a high content of bound styrene was obtained in the same manner as in Example 18 except that the charged amounts of styrene and butadiene were changed.

Polymerization conditions and molecular characteristics of the copolymers obtained in Examples 1 through 17 and Comparative Examples 1–4 are shown in Table 2, and those of Examples 18–26 and Comparative Examples 5 through 9 are shown in Table 3.

Physical properties of rubber compositions

EXAMPLES 27 THROUGH 34 AND COMPARATIVE EXAMPLES 10 AND 11

A vulcanizate was produced from a sample with an extender oil or liquid rubber according to a compounding recipe B in Table 1 (for high performance tire), and physical properties thereof were evaluated. The polymer used in the evaluations as well as the evaluated results of the physical properties are shown in Table 4. Physical values of tan δ at 0° C. tan δ at 50° C. Lambourn abrasion, and dry skid are given by index by taking those of Comparative Example 11 as 100. Example 30 was inferior to the other samples in terms of processability.

EXAMPLES 35 AND 36 AND COMPARATIVE EXAMPLE 12

A vulcanizate was produced from a styrene-butadiene copolymer added with neither extender oil nor liquid rubber according to a compounding recipe A in Table 1 (for low fuel consumption tire), and physical properties thereof were evaluated. The polymer used in the evaluations as well as the evaluated results of the physical properties are shown in Table 4. Physical values of tan δ at 0° C. tan δ at 50° C. Lambourn abrasion amount, and dry skid are given by index by taking those of Comparative Example 12 as 100.

EXAMPLE 37 AND COMPARATIVE EXAMPLES 13 AND 14

A vulcanizate was produced from a polybutadiene polymer added with neither extender oil nor liquid rubber according to a compounding recipe C in Table 1 (for large size tire), and physical properties thereof were evaluated. Physical values of tan δ at 0° C., tan δ at 50° C., Lambourn abrasion, and dry skid are given by index by taking those of Comparative Example 13 as 100. The polymer used and the evaluated results of the physical properties are shown in Table 4. High cis-polybutadiene (BRO1 manufactured by Japan Synthetic Rubber Co., Ltd.) was also evaluated as Comparative Example 14.

EXAMPLES 38–46 AND COMPARATIVE EXAMPLES 15–18

A vulcanizate was produced according to a compounding recipe A in Table 1 (for large size tire), and physical properties thereof were evaluated. Physical values of tan δ at 0° C., tan δ at 50° C., Lambourn abrasion, and dry skid are given by index by taking those of Comparative Example 15 as 100. The polymer used in the evaluations as well as the evaluated results of the physical properties are shown in Table 5.

The following are seen from Tables 2 through 5.

(i) When comparison was made regarding the polymerizing time between Example 1 and Comparative Example 1 and between Example 18 and Comparative Examples 5 and 8, it is seen that the polymerizing time was shortened to the same level in the case of using conventional organic lithium compounds when the special lithium alkoxide in the present invention was added to lithium amide. Further, the reactivity between the modifier and polymer terminals can be greatly enhanced.

(ii) When comparison is made between Example 1 and Examples 15 and 16, it is seen that the initiator used in the present invention enables the intended polymer or copolymer to be produced in a shorter time without changing the modifying reactivity.

(iii) As to Examples 27 through 34 and Comparative Examples 10 and 11 for the evaluation of high performance tires, dry skid resistance and tan δ at 0° C. of the rubber composition in Example 32 having high vinyl content and high bound styrene content can be improved, while the other physical properties are being maintained at the same levels. The rubber composition in Example 33 having a medium content of vinyl bonds has the best tan δ at 50° C. and better abrasion resistance. The rubber composition in Example 31 having a low vinyl content has the best tensile strength and good abrasion resistance. When liquid rubber is added instead of an extender oil, tensile strength, abrasion resistance and dry skid resistance can be further improved (Example 28).

(iv) When evaluation is effected between Examples 35 and 36 and Comparative Example 12 or between Examples 38 through 46 and Comparative Examples 15 through 18 for the evaluation of low fuel consumption tires, functional groups can be effectively introduced into both opposite terminals of molecular chains and the physical properties can be improved. In Examples 35 and 42, tan δ at 50° C. is largely improved, and various physical properties can be well balanced in Example 36. In addition, tan δ at 50° C. and abrasion resistance are largely improved in Example 38.

(v) When comparison is made between Example 37 and Comparative Examples 13 and 14 for the evaluation of large size tires, it is seen that tan δ at 50° C. and abrasion resistance was improved by effectively introducing functional groups at both opposite terminals of molecular chains, which gave even better results than those given by in a high-cis polybutadiene which has been considered to be optimum in the conventional large size tires.

As having been described above, according to the present invention, the polymerization or copolymerization reaction is rapidly proceeded by using the initiator is the reaction product between the specific alcohol and the organic lithium compound and/or the specific lithium alkoxide compound is added to the reaction product between the secondary amine compound and the organic lithium compound and/or the lithium amide compound. Further, the random copolymer of the conjugated diolefin and aromatic vinyl compound, which is effectively modified or coupled with the organic compound containing a hetero atom, the tin compound and/or the silicon compound, can be produced. The rubber composition containing the above polymer or copolymer has excellent tensile strength, abrasion resistance, rolling resistance and steering stability, and may be favorably used as tire treads which are not limited to specific uses but used over a wide ranges including high performance tires, low fuel consumption tires and large size tires.

TABLE 1

| Recipe | A | B | C |
|---|---|---|---|
| Natural rubber | 30 | 0 | 50 |
| (S) BR | 70 | 100 | 50 |
| High aromatic extender oil | 0 | 7.5 | 0 |
| Carbon black | 50 | 75 | 50 |
| Stearic acid | 2 | 2 | 2 |
| Zinc oxide | 3 | 3 | 3 |
| Antioxidant | | | |
| 810 NA | 1 | 0 | 1 |
| TP | 0.8 | 0 | 0.8 |
| Vulcanization accelerator | | | |
| DPG | 0.6 | 0 | 0.6 |
| DM | 1.2 | 1 | 1.2 |
| NS | 0 | 0.5 | 0 |
| Sulfur | 1.5 | 2 | 1.5 |

810NA: N-phenyl-N'-isopropyl-p-phenylenediamine
TP: sodium-dibutyl thiocarbamate
DPG: dipenyl guanidine
DP: dibenzothiazyl sulfide
NS: N-t-butyl-2-benzothazyl sulfenamide TABLE 2(a)

| | Polymer No. | Secondary amine (A)(mmol) | $a_2$ component (mmol) | Alcohol (mmol) | $b_2$ component (B)(mmol) | n-BuLi (mmol) | tetra-hydrofuran (g) | butadiene (g) | styrene (g) | butadiene (added before modification) (g) |
|---|---|---|---|---|---|---|---|---|---|---|
| Example 1 | A | BuN 3.4 | | | E2NOLi 1.69 | 3.4 | 1.68 | 324 | 240 | 36 |
| Example 2 | B | BuN 3.4 | | | E2NOLi 1.69 | 3.4 | 1.68 | 324 | 240 | 36 |
| Example 3 | C | BuN 3.4 | | | E2NOLi 1.69 | 3.4*1 | 1.68 | 324 | 240 | 36 |
| Example 4 | D | BuN 3.4 | | | E2NOLi 3 | 3.4 | 1.68 | 324 | 240 | 36 |
| Example 5 | E | Bun 3.4 | | | E2NOLi 1.69 | 3.4 | 1.68 | 324 | 240 | 36 |
| Example 6 | F | BuN 3.4 | | | E2NOLi 1.69 | 3.4 | 1.68 | 324 | 240 | 36 |
| Example 7 | G | BuN 3.4 | | | E2NOLi 1.69 | 3.4 | 1.68 | 324 | 240 | 36 |
| Example 8 | H | BuN 3.4 | | | E2NOLi 1.69 | 3.4 | 72 | 294 | 270 | 36 |
| Example 9 | I | BuN 3.4 | | | E2NOLi 1.69 | 3.4 | 6.72 | 384 | 180 | 36 |
| Enample 10 | J | BuN 7.4 | | | E2NOLi 3.7 | 7.4 | 1.68 | 324 | 240 | 36 |
| Example 11 | K | BuN 7.4 | | | E2NOLi 3.7 | 7.4 | 0.84 | 600 | 0 | 0 |
| Example 12 | L | BuN 7.4 | | | E2NOLi 3.7 | 7.4 | 26.4 | 444 | 120 | 36 |
| Example 13 | M | BuN 7.4 | | | E2NOLi 3.7 | 9 | 1.68 | 324 | 240 | 36 |
| Example 14 | N | BuN 7.4 | | | E2NOLi 3.7 | 7.4 | 1.68 | 360 | 240 | 0 |
| Example 15 | O | BuN 7.4 | | E2NOH 3.7 | | 11.1 | 1.68 | 324 | 240 | 36 |
| Example 16 | P | BuN 7.4 | | E2NOH 3.7 | | 11.1 | 1.68 | 324 | 240 | 36 |
| Example 17 | Q | BuN 7.4 | | | E2NOLi 3.7 | 7.4 | 1.68 | 324 | 240 | 36 |
| Comparative Example 1 | R | BuN 0 | | | | 0 | 3 | 1.68 | 324 | 240 | 36 |
| Comparative Example 2 | S | BuN 0 | | | | 0 | 7 | 0.84 | 600 | 0 | 0 |
| Comparative Example 3 | T | BuN 0 | | | | 0 | 6.3 | 26.4 | 444 | 120 | 36 |
| Comparative Example 4 | U | BuN 3.4 | | | E2NOLi 1.69 | 3.4 | 1.68 | 240 | 360 | 36 |

TABLE 2(b)

| | Modifier (mmol) | polymerization starting temperature (°C.) | polymerization time (min.) | Vinyl content (%) | Styrene content (%) | Extender oil (part by weight) | Liquid rubber (part by weight) | Mooney viscosity | Coupling rate (%) |
|---|---|---|---|---|---|---|---|---|---|
| Example 1 | SiCl4 1.27 | 60 | 60 | 23 | 40 | 37.5 | 0 | 54 | 60 |
| Example 2 | SiCl4 1.27 | 60 | 60 | 23 | 40 | 0 | 37.5 | 52 | 60 |
| Example 3 | SiCl4 1.27 | 60 | 53 | 23 | 40 | 37.5 | 0 | 57 | 58 |
| Example 4 | SiCl4 1.27 | 60 | 60 | 20 | 37 | 37.5 | 0 | 50 | 52 |
| Example 5 | DEAP 1.27 | 60 | 60 | 22 | 40 | 37.5 | 0 | 50 | 62 |
| Example 6 | BzN 1.27 | 60 | 60 | 21 | 41 | 37.5 | 0 | 60 | 58 |
| Example 7 | C-MDI 1.89 | 60 | 60 | 20 | 38 | 37.5 | 0 | 50 | 50 |
| Example 8 | C-MDI 1.89 | 30 | 50 | 60 | 45 | 37.5 | 0 | 45 | 55 |
| Example 9 | C-MDI 1.89 | 50 | 63 | 40 | 31 | 37.5 | 0 | 50 | 57 |
| Example 10 | C-MDI 4.1 | 60 | 54 | 20 | 39 | 0 | 0 | 58 | 67 |
| Example 11 | C-MDI 4.1 | 60 | 25 | 15 | 0 | 0 | 0 | 48 | 50 |
| Example 12 | C-MDI 4.1 | 30 | 45 | 62 | 20 | 0 | 0 | 47 | 54 |
| Example 13 | C-MDI 4.1 | 60 | 43 | 21 | 40 | 0 | 0 | 57 | 75 |
| Example 14 | C-MDI 4.1 | 60 | 50 | 18 | 39 | 0 | 0 | 50 | 55 |
| Example 15 | C-MDI 4.1 | 60 | 53 | 20 | 40 | 0 | 0 | 56 | 63 |
| Example 16 | C-MDI 4.1 | 60 | 49 | 20 | 41 | 0 | 0 | 54 | 60 |
| Example 17 | C-MDI 4.1 | 40 | 70 | 25 | 40 | 0 | 0 | 55 | 61 |
| Comparative Example 1 | SiCl4 0.75 | 60 | 60 | 21 | 40 | 37.5 | 0 | 50 | 75 |
| Comparative Example 2 | SiCl4 1.75 | 60 | 15 | 15 | 0 | 0 | 0 | 52 | 70 |
| Comparative Example 3 | SnCl4 1.57 | 30 | 25 | 61 | 19 | 0 | 0 | 70 | 65 |
| Comparative Example 4 | C-MDI 1.27 | 60 | 62 | 18 | 60 | 37.5 | 0 | 60 | 60 |

*1: 0.1 mmol dodecylbenzene potassium sulfonate was used in combination.

Note:
BUN: di-n-butylamine, BuNLi: lithium di-n-butylamide, E2NOH: N,N-diethylaminoethanol, E2NOLi: N,N-diethylamino lithium ethoxide, C-MDI: polymeric type diphenylmethane diisocyanate (Number of isocyanate groups per molecule; 2.6), DEAP: diethyl adipate, BzN:4,4'-bis(diethylamino)-benzophenone, snCl4: tin tetrachloride, SiCl4: silicon tetrachloride, liquid rubber: styrene-butadiene copolymer (average molecular weight . . . 10,000, styrene content . . . 25%)

TABLE 3(a)

| | Polymer No. | Secondary amine (A)(mmol) | a₂ component (mmol) | Alcohol (B)(mmol) | b₂ component (mmol) | n-BuLi (mmol) | tetra-hydrofuran (g) | butadiene (g) | styrene (g) | butadiene (added before modification (g) |
|---|---|---|---|---|---|---|---|---|---|---|
| Example 18 | V | BuN 7.4 | | | E2NOLi 3.7 | 7.4 | 1.68 | 324 | 240 | 36 |
| Example 19 | W | BuN 9 | | | E2NOLi 4.5 | 9 | 1.68 | 324 | 240 | 36 |
| Example 20 | X | BuN 7.4 | | E2NOH 3.7 | | 11.1 | 1.68 | 324 | 240 | 36 |
| Example 21 | Y | BuN 7.4 | | E2NOH 3.7 | | 11.1 | 2.52 | 328 | 180 | 36 |
| Example 22 | Z | BuN 7.4 | | E2NOH 3.7 | | 11.1 | 7.2 | 324 | 240 | 36 |
| Example 23 | AA | | BuNLi 7.4 | | E2NOLi 2.2 | | 1.68 | 324 | 240 | 36 |
| Example 24 | AB | | ENLi 7.4 | THOH 3.7 | | 3.7 | 1.68 | 324 | 240 | 36 |
| Example 25 | AC | MBzN 7.4 | | | E2NOLi 3.7 | 7.4 | 1.68 | 324 | 240 | 36 |
| Example 26 | AD | BuN 7.4 | | | E2NOLi 3.7 | 7.4 | 71 | 324 | 240 | 36 |
| Comparative Example 5 | AE | BuN 9.1 | | | | 9.1 | 1.68 | 324 | 240 | 36 |
| Comparative Example 6 | AF | | | | | 8.2 | 1.68 | 324 | 240 | 36 |
| Comparative Example 7 | AG | MAn 7.4 | | | E2NOLi 3.4 | 7.4 | 1.68 | 324 | 240 | |
| Comparative Example 8 | AH | BuN 7.4 | | | tBuOLi 3.7 | 7.4 | 1.68 | 324 | 240 | 36 |
| Comparative Example 9 | AI | BuN 7.4 | | | E2NOLi 3.7 | 7.4 | 1.68 | 360 | 200 | 40 |

TABLE 3(b)

| | Modifier (mmol) | Polymerization starting temperature (°C.) | Maximum polymerization temperature (°C.) | polymerization time (min.) | Vinyl content (%) | Styrene content (%) | Mooney viscosity | Number-average molecular weight ($\times 10^4$) Mn | Weight-average molecular weight ($\times 10^4$) Mw | Molecular weight distribution (Mw/Mn) | Coupling rate (%) |
|---|---|---|---|---|---|---|---|---|---|---|---|
| Example 18 | BuSnCl 3.4 | 60 | 70 | 50 | 21 | 40 | 63 | 18 | 33 | 1.8 | 63 |
| Example 19 | SnCl4 1.9 | 60 | 70 | 50 | 20 | 40 | 65 | 18 | 37 | 2.1 | 68 |
| Example 20 | BuSnCl 3.4 | 60 | 10 | 60 | 23 | 40 | 65 | 18 | 36 | 2 | 63 |
| Example 21 | BuSnCl 3.4 | 60 | 70 | 60 | 25 | 31 | 66 | 19 | 37 | 1.9 | 70 |
| Enample 22 | BuSnCl 3.4 | 60 | 70 | 60 | 32 | 40 | 65 | 18 | 35 | 1.9 | 66 |
| Enample 23 | BuSnCl 3.4 | 60 | 70 | 55 | 20 | 40 | 68 | 21 | 38 | 1.8 | 53 |
| Example 24 | BuSnCl 3.4 | 60 | 70 | 60 | 19 | 40 | 67 | 16 | 37 | 2.3 | 61 |
| Example 25 | BuSnCl 3.4 | 60 | 70 | 120 | 20 | 39 | 70 | 19 | 39 | 2.1 | 21 |
| Example 26 | BuSnCl 3.4 | 60 | 70 | 60 | 62 | 40 | 64 | 18 | 35 | 1.9 | 65 |
| Comparative Example 5 | BuSnCl 3.4 | 60 | 70 | 80 | 17 | 40 | 61 | 19 | 34 | 1.8 | 18 |
| Comparative Example 6 | BuSnCl 3.4 | 60 | 70 | 40 | 20 | 39 | 70 | 29 | 41 | 1.4 | 67 |
| Comparative Example 7 | | 60 | 70 | 120 | | | | | | | |
| Comparative Example 8 | BuSnCl 3.4 | 60 | 70 | 100 | 23 | 40 | 68 | 19 | 38 | 2 | 15 |
| Comparative Example 9 | BuSnCl 3.4 | 60 | 70 | 60 | 20 | 60 | 65 | 21 | 37 | 1.8 | 67 |

Note: BuN: di-n-butylamine, MB₂N: N-methylbenzylamine, MAn: N-methylaniline, BuNLi: lithium di-n-butylamide, ENLi: lithium diethylamide, E2NOH: N,N-diethylaminoethanol, THOH: tetrahydrofurfuryl alcohol, E2NOLi: Lithium N,N-diethylaminoethoxide, THOLi: lithium tetrahydrofurfuryl alkoxide, BuSnCl: tin dichloro dibutyl, tBuOLi: lithium tertiary butoxide, SnCl4: tin tetrachloride

TABLE 4

| | Polymer No. | Recipe | Tensile strength (kgf/cm²) | Tan δ 0° C. | Tan δ 50° C. | Lambourn abrasion | Dry skid |
|---|---|---|---|---|---|---|---|
| Example 27 | A | B | 220 | 104 | 103 | 135 | 105 |
| Example 28 | B | B | 240 | 107 | 108 | 169 | 120 |
| Example 29 | E | B | 216 | 102 | 105 | 129 | 107 |
| Example 30 | F | B | 234 | 101 | 109 | 134 | 106 |

TABLE 4-continued

|  | Polymer No. | Recipe | Tensile strength (kgf/cm²) | Tan δ 0° C. | Tan δ 50° C. | Lambourn abrasion | Dry skid |
|---|---|---|---|---|---|---|---|
| Example 31 | G | B | 225 | 107 | 102 | 140 | 106 |
| Example 32 | H | B | 190 | 128 | 100 | 100 | 140 |
| Example 33 | I | B | 215 | 100 | 113 | 125 | 100 |
| Example 34 | C | B | 210 | 100 | 101 | 120 | 115 |
| Comparative Example 10 | U | B | 207 | 110 | 74 | 80 | 110 |
| Comparative Example 11 | R | B | 185 | 100 | 100 | 100 | 100 |
| Example 35 | L | A | 270 | 102 | 158 | 140 | 100 |
| Example 36 | J | A | 297 | 110 | 120 | 146 | 103 |
| Comparative Example 12 | T | A | 250 | 100 | 100 | 100 | 100 |
| Example 37 | K | C | 278 | 100 | 126 | 119 | 101 |
| Comparative Example 13 | S | C | 276 | 100 | 100 | 100 | 100 |
| Comparative Example 14 | BR01 | C | 268 | 95 | 104 | 110 | 95 |

BR01: high cis-polybutadiene (cis = 96%) by Japan Synthetic Rubber Co., Ltd.

TABLE 5

|  | Polymer No. | Recipe | Tensile strength (kgf/cm²) | Tan δ 0° C. | Tan δ 50° C. | Lambourn abrasion |
|---|---|---|---|---|---|---|
| Example 38 | V | A | 298 | 105 | 121 | 127 |
| Example 39 | W | A | 288 | 103 | 110 | 124 |
| Example 40 | X | A | 291 | 103 | 118 | 125 |
| Example 41 | Y | A | 284 | 105 | 114 | 118 |
| Example 42 | Z | A | 281 | 115 | 125 | 119 |
| Example 43 | AA | A | 263 | 106 | 112 | 116 |
| Example 44 | AB | A | 282 | 105 | 107 | 121 |
| Example 45 | AC | A | 257 | 102 | 103 | 109 |
| Example 46 | AD | A | 254 | 135 | 104 | 107 |
| Comparative Example 15 | AE | A | 224 | 100 | 100 | 100 |
| Comparative Example 16 | AP | A | 251 | 100 | 101 | 97 |
| Comparative Example 17 | AH | A | 238 | 102 | 93 | 83 |
| Comparative Example 18 | AI | A | 255 | 130 | 83 | 81 |

We claim:

1. A process for producing a conjugated diolefin polymer or copolymer, comprising the step of polymerizing 55–100% by weight of a conjugated diolefin with 0–45% by weight of an aromatic vinyl compound as monomers by using at least one of initiators [a1] and [a2] and at least one of initiators [b1] and [b2] in a hydrocarbon as a solvent:

[a1] a reaction product between at least one secondary amine compound (A) selected from the group consisting of compounds represented by the following formulae (a1-1), (a1-2) and (a1-3) and an organic lithium compound, a molar ratio between said at least one secondary amine compound (A) and said organic lithium compound being 1:0.2–5;

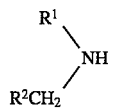
(a1-1)

in which $R^1$ and $R^2$ are the same or different, and represent a group selected from the group consisting of an alkyl group having 1–20 carbon atoms, and an aryl group having 6–20 carbon atoms;

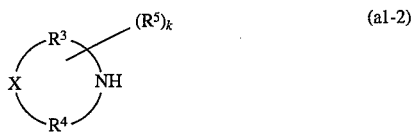
(a1-2)

in which $R^3$ and $R^4$ are the same or different and represent an alkylene group having 1–3 carbon atoms, X is a group selected from the group consisting of —CH$_2$—, —O— and —NH—, $R^5$ is an alkyl group having 1–5 carbon atoms, and k is an integer of 0–4;

(a1-3) 5-benzyloxyindole, 3-azaspiro[5,5]undecane, 3-azabicyclo[3,2,2]nonane, and carbazole;

[a2] a lithium amide compound obtained by substituting Li for H in a >NH group of said secondary amine compound (A);

[b1] a reaction product between at least one alcohol (B) selected from the group consisting of compounds represented by the following formulae (b1-1), (b1-2), (b1-3), (b1-4) and (b1-5) and an organic lithium compound, a molar ratio between said at least one alcohol (B) and said organic lithium compound being 1:0.8–5:

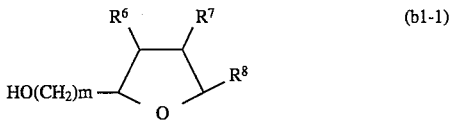
(b1-1)

in which $R^6$, $R^7$, and $R^8$ are the same or different and represent H— or an alkyl group having 1–5 carbon atoms, and m is an integer of 1–3;

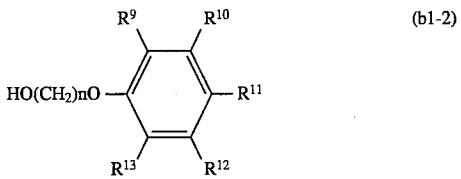
(b1-2)

in which $R^9$, $R^{10}$, $R^{11}$, $R^{12}$, $R^{13}$ are the same or different, and represent H— or an alkyl group having 1–5 carbon atoms, and n is an integer of 1–3;

(b1-3) $R^{14}{}_p N[(CH_2)_q—OH]_{3-p}$ in which $R^{14}$ is an alkyl group having 1–20 carbon atoms or an aryl group having 6–20 carbon atoms, p is an integer of 0–2, and q is an integer of 1–3:

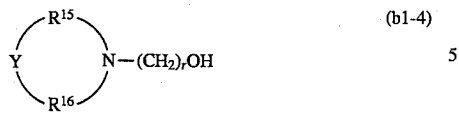
(b1-4)

$R^{15}$ and $R^{16}$ are the same or different, and represent an alkylene group having 1–3 carbon atoms, Y is a group selected from the group consisting of —$CH_2$—, —O—, —NH— and =N—$(CH_2)_s$OH, r is an integer of 1–3, and s is an integer of 1–3;

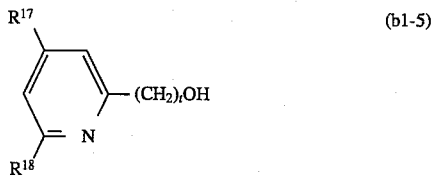
(b1-5)

$R^{17}$ and $R^{18}$ are the same or different, and represent H— or an alkylene group having 1–5 carbon atoms, and t is an integer of 1–3;

[b2] a lithium alkoxide compound obtained by substituting Li for H of an —OH in the alcohol (B).

2. The producing process set forth in claim 1, further comprising the step of, after the polymerization, modifying or coupling active terminals of polymer or copolymer with use of one or more compounds, as a modifier, within a time period during which said active terminals of the polymer or copolymer remain, wherein said compounds are selected from the group consisting of "$a_o$" an isocyanate compound and/or an isothiocyanate compound, "$b_o$" a derivative of an isocyanuric acid and/or a thiocarbonyl-containing compound having a chemical structure corresponding to that of said isocyanuric acid derivative, "$c_o$" a urea compound, "$d_o$" an amide compound and/or an imide compound, "$e_o$" an N-alkyl-substituted oxazolidinone compound, "$f_o$" a pyridyl-substituted ketone compound and/or a pyridyl-substituted vinyl compound, "$g_o$" a lactam compound, "$h_o$" a silicon compound, "$i_o$" an ester compound, "$j_o$" a ketone compound, and "$k_o$" a tin compound.

3. The producing process set forth in claim 2, wherein the polymerization is effected by using, as the initiator, at least one of [a1] which is a reaction product between di-n-butyl amine and the organic lithium compound and [a2] which is lithium d-n-butylamide; and at least one of [b1] which is a reaction product between N,N-diethylethanolamine and/or tetrahydrofurfuryl alcohol and the organic lithium compound; and [b2] which is N,N-diethylaminolithium ethoxide and/or tetrahydrofurfuryl lithium alkoxide; wherein further polymerization is effected after 0.5–500 mol of 1,3-butadiene is added to the resulting polymer or copolymer per 1 gram equivalent of lithium; wherein the resulting polymer or copolymer is modified or coupled by adding at least one modifier selected from the group consisting of organic diphenylmethane diisocyanate, dimethyl adipate, 4,4'-bis-(dimethylamino)benzophenone, tin tetrachloride, silicon tetrachloride, and tin dichlorodibutyl; and wherein the rate of the modified or coupled polymer or copolymer is not less than 20% by weight relative to the entire polymer or copolymer.

4. The producing process set forth in claim 2, wherein before said modifier is added, 0.5–500 mol of 1,3-butadiene per 1 gram equivalent of lithium atoms is added, and then the polymerization or copolymerization is further effected.

5. The producing process set forth in claim 2, wherein a molar ratio between said lithium compound of said [a1] or said lithium amide compound of said [a2] and said organic lithium compound of said [b1] or said lithium alkoxide compound of said [ b2 ] is 1:0.01–2.0.

6. The producing process set forth in claim 2, wherein said [a1] is a reaction product between the secondary amine compound of the formula (a1-1) and said organic lithium compound, and said [a2] is the lithium amide compound obtained by substituting Li for H in —NH groups of the compound of said (a1-1).

7. The producing process set forth in claim 2, wherein said [b1] is a reaction product between the compound of said (b1-1) and/or the compound of said (b1-3) and said organic lithium compound, and said [b2]is the lithium alkoxide compound obtained by substituting Li for H in —OH groups of the compound of said (b1-1) and/or the compound of said (b1-3).

8. The producing process set force in claim 2, wherein said organic lithium compound is an alkyl lithium having 3–10 carbon atoms.

9. The producing process set forth in claim 2, wherein said hydrocarbon solvent is a cycloaliphatic hydrocarbon and/or an aliphatic hydrocarbon having 3–10 carbon atoms.

10. The producing process set forth in claim 2, wherein said conjugated diolefin is 1,3-butadiene and/or isoprene, and said aromatic vinyl compound is styrene.

11. The producing process set forth in claim 2, wherein said [a1] is a reaction product between di-n-butylamine and said organic lithium compound, and [a2] is lithium di-n-butyl amide.

12. The producing process set forth in claim 2, wherein said [b1] is a reaction product between N,N-diethyl ethanolamine and/or tetrahydrofurfuryl alcohol and said organic lithium compound, and [b2] is N,N-diethylamino lithium ethoxide and/or tetrahydrofurfuryl lithium alkoxide.

13. The producing process set forth in claim 2, wherein said modifier is at least one compound selected from the group consisting of the isocyanate compound ($a_o$), the silicon compound ($h_o$) and the tin compound ($k_o$).

14. The producing process set forth in claim 2, wherein said modifier is at least one tin compound ($k_o$) in an amount of 0.05–5 gram equivalents per one gram equivalent of lithium atoms.

15. The producing process set forth in claim 2, wherein a rate of the modified or coupled polymer or copolymer to the entire polymer or copolymer is not less than 20% by weight based on the total polymer or the diolefin portion of said copolymer.

16. The producing process set forth in claim 2, wherein a content of vinyl groups in said diolefin polymer or copolymer is 15–40% by weight based on the total polymer or the diolefin portion of said copolymer.

17. The producing process set forth in claim 1, wherein polymerization occurs in the presence of an ether compound or a tertiary amine.

18. A rubber composition comprising not less than 30% by weight of a diolefin polymer or copolymer with respect to an entire rubber component, wherein said diolefin polymer or copolymer is produced by the process comprising the steps of:

(1) polymerizing 55–100% by weight of a conjugated diolefin with 0–45% by weight of an aromatic vinyl compound as monomers by using at least one of initiators [a1] and [a2], and at least one of initiators [b1] and [b2]; and (2) after the polymerization, modifying or coupling polymerization- or copolymerization-active terminals with use of one or more compounds, as a modifier, selected from the group consisting of the following compounds ($a_o$), ($b_o$), ($c_o$), ($d_o$), ($e_o$), ($f_o$), ($g_o$), ($h_o$), ($i_o$), ($j_o$) and ($k_o$), within a time period during which said active terminals remain;

Step (1):

[a1] a reaction product between at least one secondary amine compound (A) selected from the group consisting of compounds represented by the following formulae (a1-1), (a1-2) and (a1-3) and an organic lithium compound, a molar ratio between said at least one secondary amine compound (A) and said organic lithium compound being 1:0.2–5;

(a1-1)

in which $R^1$ and $R^2$ are the same or different, and represent a group selected from the group consisting of an alkyl group having 1–20 carbon atoms, and an aryl group having 6–20 carbon atoms;

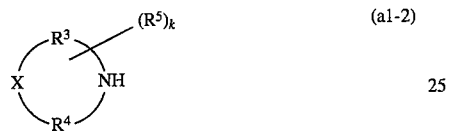
(a1-2)

in which $R^3$ and $R^4$ are the same or different and represent an alkylene group having 1–3 carbon atoms, X is a group selected from the group consisting of —$CH_2$—, —O— and —NH—, $R^5$ is an alkyl group having 1–5 carbon atoms, and k is an integer of 0–4;

(a1-3) 5-benzyloxyindole, 3-azaspiro[5,5]undecane, 3-azabicyclo[3,2,2]nonane, and carbazole;

[a2] a lithium amide compound obtained by substituting Li for H in a >NH group of said secondary amine compound (A);

[b1] a reaction product between at least one alcohol (B) selected from the group consisting of compounds represented by the following formulae (b1-1), (b1-2), (b1-3), (b1-4) and (b1-5) and an organic lithium compound, a molar ratio between said at least one alcohol (B) and said organic lithium compound being 1:0.8–5:

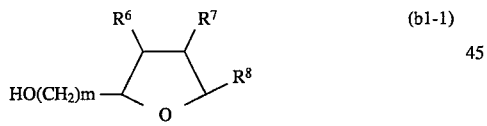
(b1-1)

in which $R^6$, $R^7$, and $R^8$ are the same or different and represent H— or an alkyl group having 1–5 carbon atoms, and m is an integer of 1–3:

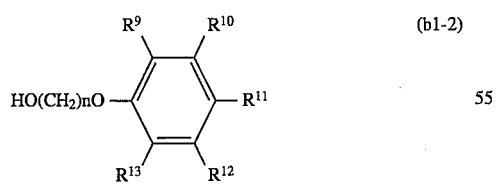
(b1-2)

in which $R^9$, $R^{10}$, $R^{11}$, $R^{12}$, and $R^{13}$ are the same or different, and represent H— or an alkyl group having 1–5 carbon atoms, and n is an integer of 1–3;

(b1-3) $R^{14}{}_pN[(CH_2)_q{-}OH]_{3-p}$ in which $R^{14}$ is an alkyl group having 1–20 carbon atoms or an aryl group having 6–20 carbon atoms, p is an integer of 0–2, and q is an integer of 1–3;

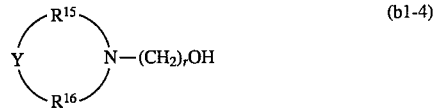
(b1-4)

$R^{15}$ and $R^{16}$ are the same or different, and represent an alkylene group having 1–3 carbon atoms, Y is a group selected from the group consisting of —$CH_2$—, —O—, —NH— and =N—$(CH_2)_s$OH, r is an integer of 1–3, and s is an integer of 1–3;

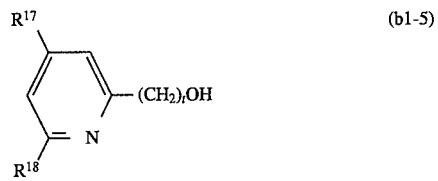
(b1-5)

$R^{17}$ and $R^{18}$ are the same or different, and represent H— or an alkylene group having 1–5 carbon atoms, and t is an integer of 1–3;

[b2] a lithium alkoxide compound obtained by substituting Li for H of an —OH in the alcohol (B);

Step (2):

"$a_o$" an isocyanate compound and/or isothiocyanate compound,

"$b_o$" a derivative of an isocyanuric acid and/or a thiocarbonyl-containing compound having a chemical structure corresponding to that of said isocyanuric acid derivative, "$c_o$" a urea compound, "$d_o$" an amide compound and/or an imide compound, "$e_o$" an N-alkyl-substituted oxazolidinone compound, "$f_o$" a pyridyl-substituted ketone compound and/or a pyridyl-substituted vinyl compound, "$g_o$" a lactam compound, "$h_o$" a silicon compound, "$i_o$" an ester compound, "$j_o$" a ketone compound, and "$k_o$" a tin compound.

19. The rubber composition set forth in claim 18, comprising the steps of:

(1) copolymerizing 55–90% by weight of said conjugated olefin and 45–10% by weight of said aromatic vinyl compound as the monomers; and (2) after the polymerization, modifying or coupling active terminals of the resulting polymer with use of one or more compounds, as a modifier, selected from the group consisting of said compounds ($a_o$), ($h_o$) and ($k_o$), within a time period during which said active terminals remain.

* * * * *